(12) United States Patent
Ohsawa

(10) Patent No.: US 12,145,313 B2
(45) Date of Patent: Nov. 19, 2024

(54) METHOD OF MANUFACTURING RUBBER PRODUCT

(71) Applicant: BRIDGESTONE CORPORATION, Tokyo (JP)

(72) Inventor: Yasuo Ohsawa, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 637 days.

(21) Appl. No.: 17/609,714

(22) PCT Filed: Nov. 26, 2019

(86) PCT No.: PCT/JP2019/046197
§ 371 (c)(1),
(2) Date: Nov. 8, 2021

(87) PCT Pub. No.: WO2020/255443
PCT Pub. Date: Dec. 24, 2020

(65) Prior Publication Data
US 2022/0220278 A1    Jul. 14, 2022

(30) Foreign Application Priority Data
Jun. 17, 2019    (JP) .................... 2019-112262

(51) Int. Cl.
*B29C 64/153*    (2017.01)
*B29C 64/141*    (2017.01)
(Continued)

(52) U.S. Cl.
CPC .......... *B29C 64/153* (2017.08); *B29C 64/141* (2017.08); *B29C 64/268* (2017.08);
(Continued)

(58) Field of Classification Search
CPC ... B29C 64/141; B29C 64/153; B29C 64/268; B33Y 10/00; B33Y 70/00; B29K 2021/006
See application file for complete search history.

(56) References Cited

U.S. PATENT DOCUMENTS 2,315,924 A * 4/1943 Bertram .................. C08J 3/124
                                                        524/925
6,110,411 A    8/2000 Clausen et al.
(Continued)

FOREIGN PATENT DOCUMENTS

JP    2004-107514 A    4/2004
JP    2011-184532 A    9/2011
(Continued)

OTHER PUBLICATIONS

Jan. 21, 2020 International Search Report issued in International Patent Application No. PCT/JP2019/046197.
(Continued)

*Primary Examiner* — Jerzi H Moreno Hernandez
(74) *Attorney, Agent, or Firm* — Oliff PLC

(57) ABSTRACT

This method includes performing adhesion prevention treatment on uncrosslinked rubber powder, which is a material of the rubber product, to prevent mutual adhesion of the uncrosslinked rubber powder, and sequentially and repeatedly forming by supplying raw rubber powder, on which the adhesion prevention treatment has been performed, and irradiating the supplied portion with an electron beam to crosslink the irradiated portion, so that the crosslinked portions are stacked following a shape of the rubber product.

4 Claims, 8 Drawing Sheets

(51) Int. Cl.
  *B29C 64/268*  (2017.01)
  *B33Y 10/00*  (2015.01)
  *B33Y 70/00*  (2020.01)
  *C08K 3/22*  (2006.01)

(52) U.S. Cl.
  CPC .............. *B33Y 10/00* (2014.12); *B33Y 70/00* (2014.12); *C08K 3/22* (2013.01); *C08K 2003/2206* (2013.01)

(56) References Cited

U.S. PATENT DOCUMENTS

| | | | |
|---|---|---|---|
| 11,981,791 B2* | 5/2024 | Ohsawa | ................ B29C 64/153 |
| 2020/0181433 A1 | 6/2020 | Yoshinaga et al. | |
| 2020/0229538 A1 | 7/2020 | Yoshinaga et al. | |
| 2021/0317285 A1* | 10/2021 | Bizet | ..................... B29C 64/153 |

FOREIGN PATENT DOCUMENTS

| | | |
|---|---|---|
| JP | 2019-019324 A | 2/2019 |
| WO | 2017/208979 A1 | 12/2017 |
| WO | 2019/035387 A1 | 2/2019 |
| WO | 2019/066732 A1 | 4/2019 |

OTHER PUBLICATIONS

May 1, 19, 2023 Extended European Search Report Issued in European Patent Application No. 19934095.1.

Dec. 21, 2021 International Preliminary Report on Patentability issued in Patent Application No. PCT/JP2019/046197.

\* cited by examiner

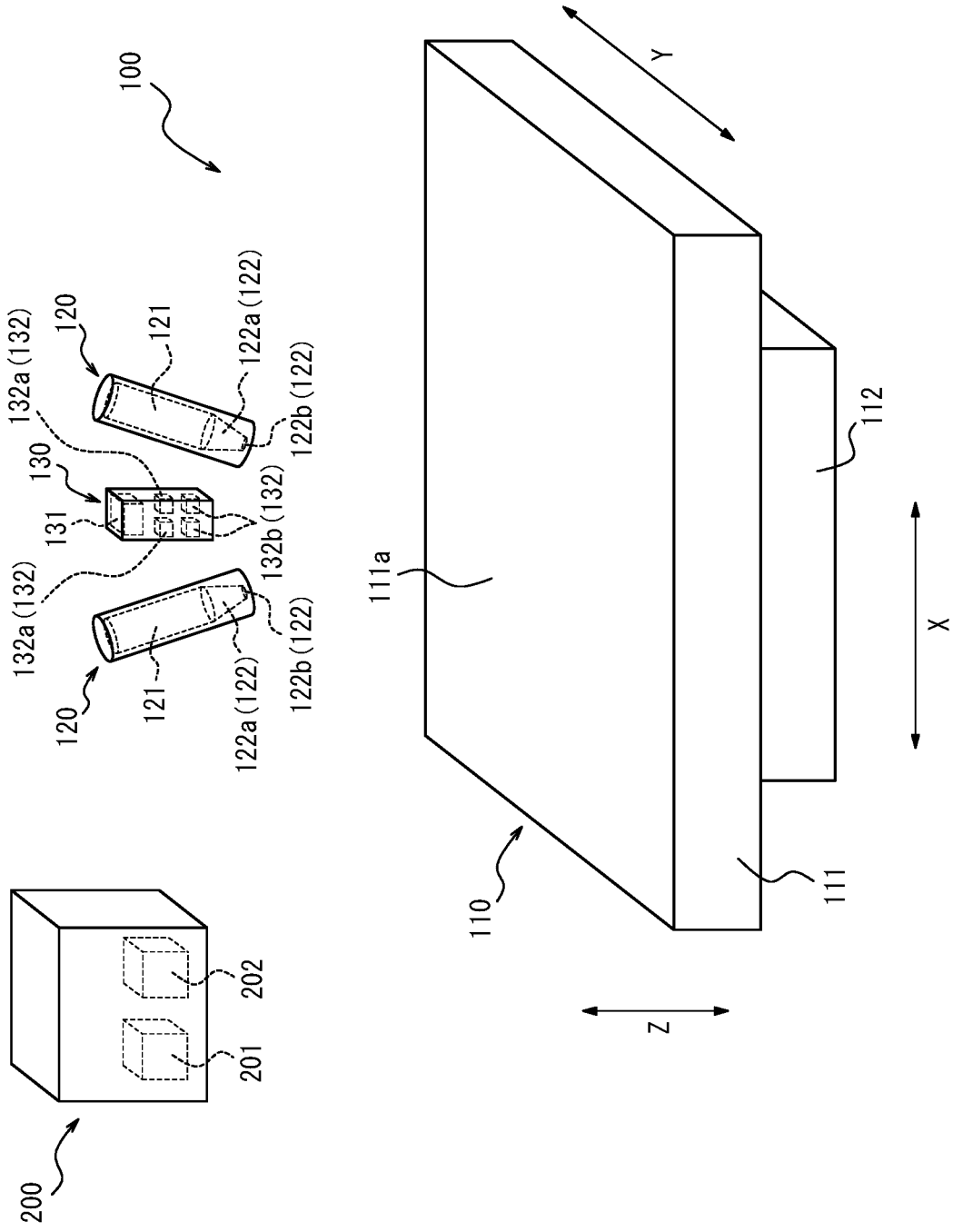

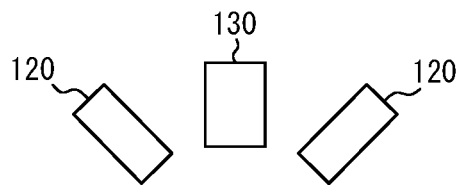
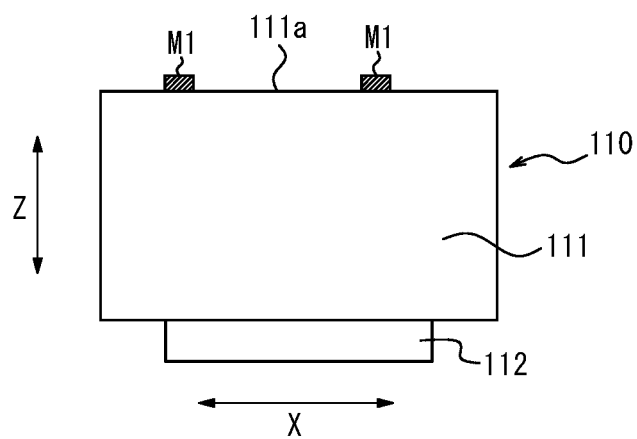
FIG. 5C
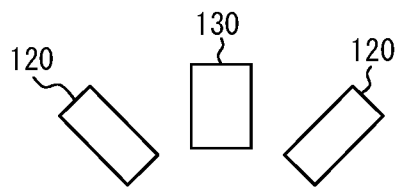
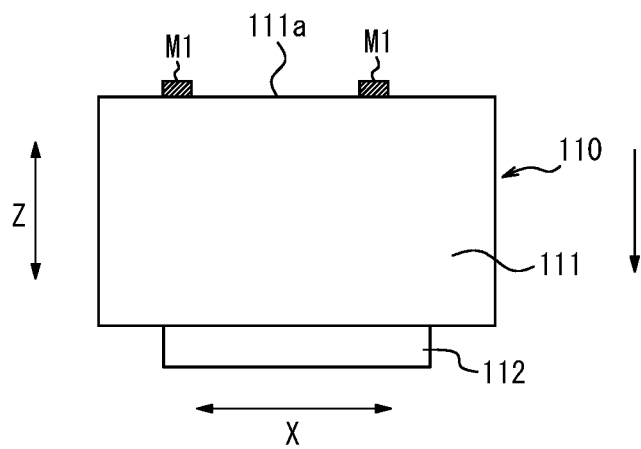
FIG. 5D

METHOD OF MANUFACTURING RUBBER PRODUCT

TECHNICAL FIELD

The present disclosure relates to a method of manufacturing a rubber product, and in particular to a method suitable for manufacturing rubber products that can flexibly respond to changes in the shape of the products.

The present application claims priority to Japanese Patent Application No. 2019-112262 filed on Jun. 17, 2019, the entire contents of which are incorporated herein by reference.

BACKGROUND

Known methods of manufacturing rubber products include a method of manufacturing a product by placing unvulcanized rubber in a mold that matches the shape of the product and vulcanizing the rubber by applying heat and pressure, as in Patent Literature (PTL) 1, and a method of placing unvulcanized rubber in a mold that is larger than the product, vulcanizing the rubber by applying heat and pressure, and then machining the rubber by cutting or the like to yield the shape of the product.

CITATION LIST

Patent Literature

PTL 1: JP 2004-107514 A

SUMMARY

Technical Problem

However, in the method of using a mold that matches the shape of the product, the mold needs to be modified or made anew when a change in the shape of the product occurs for a reason such as a change in product specifications. The production costs and the time and effort for processing have thus been problematic. Furthermore, in a method of using a mold larger than the product, there has been room for improvement in the manufacturing accuracy, such as dimensional accuracy during machining, depending on the physical properties of the rubber.

It is an aim of the present disclosure to provide a method of manufacturing a rubber product that can flexibly respond to changes in the shape of a product and can achieve high manufacturing accuracy.

Solution to Problem

We carefully studied how to solve the aforementioned problem and concluded that a desired product shape can be obtained without using a mold by repeating a formation process of supplying material and treating the material according to the properties of the material, and then stacking following the shape of the desired product. After further investigating the aforementioned additive manufacturing, we discovered that the additive manufacturing can be applied to rubber products by performing appropriate treatment on the powder of uncrosslinked rubber to be used as a material and further crosslinking the powder of the uncrosslinked rubber, thereby completing the present disclosure.

We provide the following.

A method of manufacturing a rubber product according to the present disclosure includes:

performing adhesion prevention treatment on uncrosslinked rubber powder, which is a material of the rubber product, to prevent mutual adhesion of the uncrosslinked rubber powder; and sequentially and repeatedly forming by supplying raw rubber powder, on which the adhesion prevention treatment has been performed, and irradiating the supplied portion with an electron beam to crosslink the irradiated portion, so that the crosslinked portion is stacked following a shape of the rubber product.

"Supplying raw rubber powder, on which the adhesion prevention treatment has been performed, and irradiating the sprayed portion with an electron beam" preferably refers to the raw rubber powder being supplied and the electron beam being irradiated simultaneously, but the cases of the supply of raw rubber powder preceding the irradiation with the electron beam and the irradiation with the electron beam preceding the supply of raw rubber powder are also included.

Advantageous Effect

According to the present disclosure, a method of manufacturing a rubber product that, without use of a mold, can flexibly respond to changes in the shape of a product and can achieve high manufacturing accuracy can be provided.

BRIEF DESCRIPTION OF THE DRAWINGS

In the accompanying drawings:

FIG. 4 is a perspective view schematically illustrating the configuration of an additive manufacturing apparatus;

FIG. 5C is a cross-sectional view schematically illustrating a state in which a layer corresponding to a thin piece has been manufactured;

FIG. 5D is a cross-sectional view schematically illustrating treatment after the layer corresponding to a thin piece has been manufactured;

DETAILED DESCRIPTION

Figure 1:
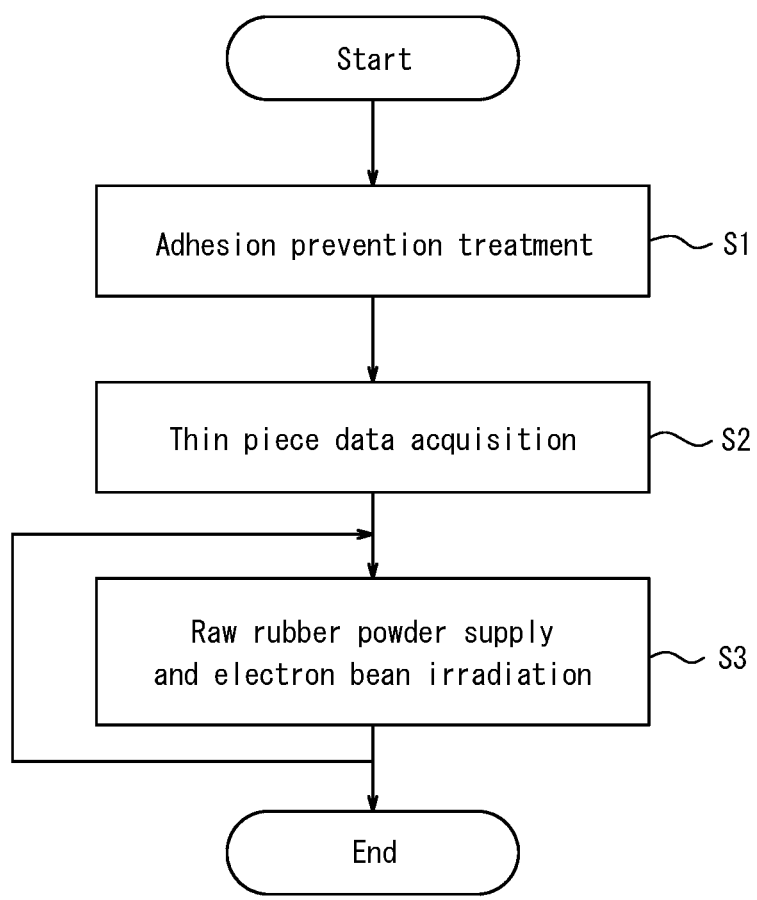
FIG. 1 is a flowchart illustrating an outline of a method of manufacturing a rubber product according to an embodiment of the present disclosure.

Methods of manufacturing rubber products according to embodiments of the present disclosure are described below. FIG. 1 is a flowchart illustrating an outline of a method of manufacturing a rubber product according to an embodiment of the present disclosure.

As illustrated in FIG. 1, a method of manufacturing a rubber product according to an embodiment of the present disclosure includes performing adhesion prevention treatment on uncrosslinked rubber powder, which is a material of a rubber product, to prevent mutual adhesion of the uncrosslinked rubber powder (step S1), acquiring data on a plurality of thin pieces of a rubber product (step S2), and sequentially and repeatedly forming by supplying raw rubber powder, on which the adhesion prevention treatment has been performed, and irradiating the supplied portion with an electron beam to crosslink the irradiated portion, so that crosslinked portions are stacked following a shape of the rubber product (step S3), thereby manufacturing a rubber product.

Figure 2:
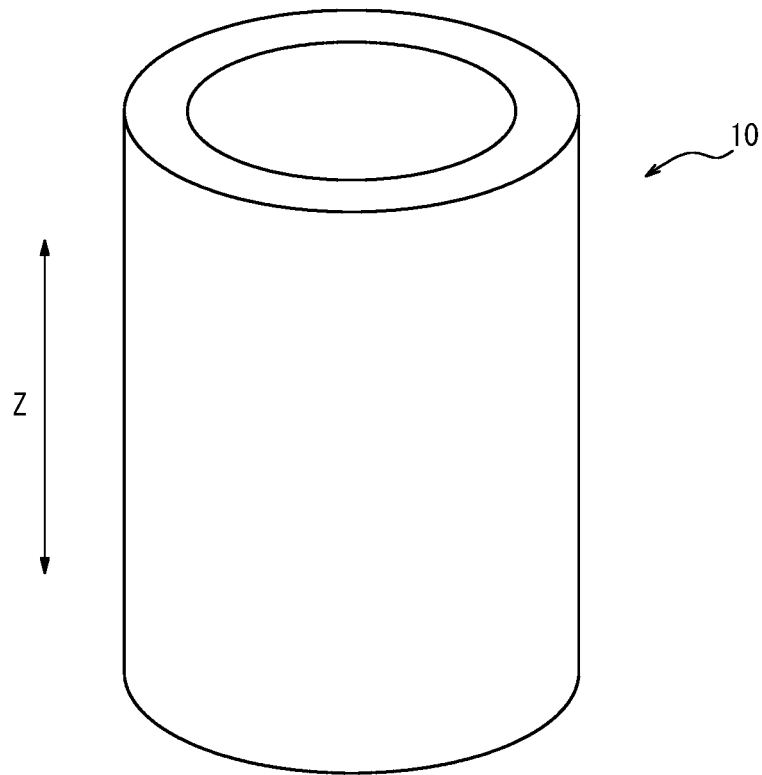
FIG. 2 is a diagram illustrating an example of a rubber product manufactured by the method of manufacturing a rubber product according to an embodiment of the present disclosure.

FIG. 2 illustrates a rubber product 10, which is an example of a rubber product to be manufactured by the method of manufacturing a rubber product according to the present embodiment. As illustrated in FIG. 2, the rubber product 10 can, for example, have a cylindrical shape.

Here, thin pieces refer to layers that are divided by cutting at numerous planes orthogonal to the axis along the stacking direction of the rubber product to be manufactured.

Figure 3:
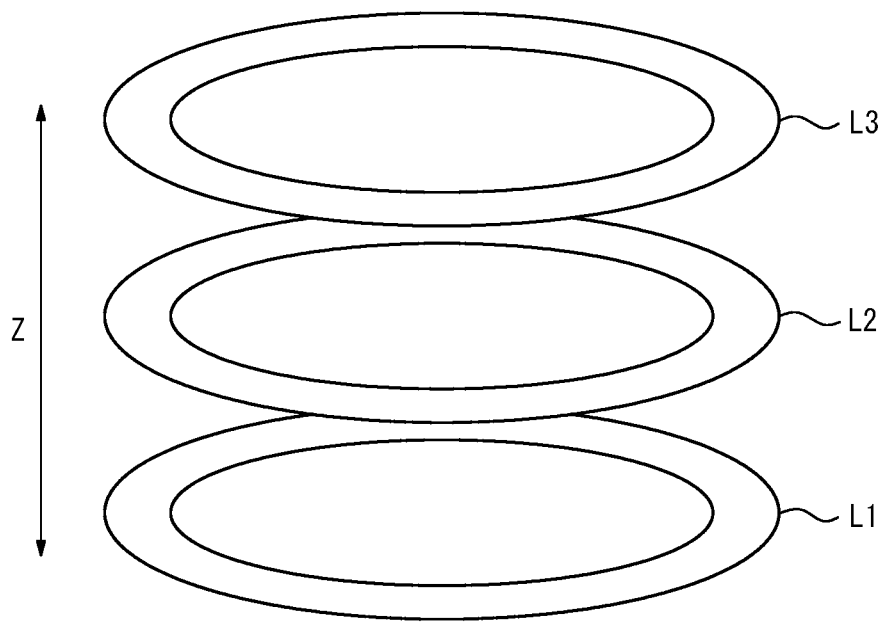
FIG. 3 is a diagram illustrating thin pieces.

In the example of the rubber product 10, when the Z-axis direction is the stacking direction (height), a plurality of sliced layers are formed by cutting the cylindrical three-dimensional shape at numerous planes orthogonal to the Z-axis direction. Each layer in the plurality of sliced layers illustrated in FIG. 3 is a thin piece of the rubber product 10. The stacking direction in additive manufacturing of the rubber product 10 refers to the Z-axis direction in FIGS. 2 and 3, but a suitable direction can be used as the stacking direction according to the shape, size, and the like of the rubber product to be manufactured.

Although the thin pieces L1 to L3 from the first layer to the third layer in the Z-axis direction of the rubber product 10 are illustrated in FIG. 3, the rubber product 10 is actually converted into data on thin pieces L1 to LN (N is a natural number) for the number of layers required to manufacture the rubber product 10.

In this way, the shape of the rubber product 10 is converted into the data on a plurality of thin pieces, and the thin pieces are then stacked according to a manufacturing path based on this data to manufacture the rubber product 10.

Each step is described in detail below.

[Adhesion Prevention Treatment]

In the adhesion prevention treatment step S1, uncrosslinked rubber powder, which is a material of the rubber product 10, is treated to prevent mutual adhesion of the uncrosslinked rubber powder.

A material suitable for rubber products can be used as the material forming the uncrosslinked rubber powder in the present disclosure. Powders of polyisoprene rubber (IR), styrene-butadiene copolymer rubber (SBR), polybutadiene rubber (BR), ethylene propylene diene rubber (EPDM), chloroprene rubber (CR), halogenated butyl rubber, acrylonitrile butadiene rubber (NBR), and other synthetic rubbers, in addition to natural rubber (NR), can be used as the rubber powder. Among these, powders of natural rubber (NR), styrene-butadiene copolymer rubber (SBR), and polybutadiene rubber (BR) are preferred. These rubber powders may be used alone, or a combination of two or more types thereof may be used.

The uncrosslinked rubber powder may also contain other materials other than natural rubber and synthetic rubber. As the other materials, fillers such as carbon black and silica, softeners, age resistors, zinc oxide, crosslinking accelerators, and the like may be selected as appropriate within a range not detrimental to the aim of the present disclosure. The other materials may be added not only by inclusion in the uncrosslinked rubber powder in advance but also after the treatment to prevent adhesion of the uncrosslinked rubber powder.

Furthermore, as an example of other materials, calcium oxide may be added. By the addition of calcium oxide into the uncrosslinked rubber powder, even when the rubber is heated to a temperature higher than the melting point during the crosslinking of the rubber, bubbles that might be generated in the rubber by heat can be suppressed, and cracks or tears can be prevented from occurring at the areas with bubbles.

The treatment on the uncrosslinked rubber powder to prevent mutual adhesion of the powder refers to the treatment for preventing the powder particles from adhering to each other and is suitably performed by coating the surface of the uncrosslinked rubber powder with an adhesion prevention agent. As the adhesion prevention agent, any of synthetic resin, talc, silica, calcium carbonate, calcium stearate, zinc stearate, carbon black, and the like, for example, or any combination thereof, can be used.

While the means for coating the surface of the uncrosslinked rubber powder with the adhesion prevention agent is not particularly limited, a powdered adhesion prevention agent having a diameter smaller than that of the uncrosslinked rubber powder can be stirred and mixed with the uncrosslinked rubber powder to coat the surface of the uncrosslinked rubber powder, for example. The surface of the uncrosslinked rubber powder may also be coated by applying a dissolved solution or an aqueous dispersion of the adhesion prevention agent to the surface of the uncrosslinked rubber powder. When a dissolved solution or aqueous dispersion of the adhesion prevention agent is used, a coating layer of uniform thickness can easily be formed on the surface of the uncrosslinked rubber powder, but a step of drying the uncrosslinked rubber powder is required after the application. A powdered adhesion prevention agent is preferably used to prevent an increase in the number of production steps.

The adhesion prevention treatment step may be a step included in the preparation of the uncrosslinked rubber powder that becomes the material of the rubber product 10 or may be a separate step performed after the preparation of the uncrosslinked rubber powder.

According to the adhesion prevention treatment step, mutual adhesion of the uncrosslinked rubber powder can be prevented. That is, lumps are not formed due to mutual adhesion of the uncrosslinked rubber powder. This facilitates handling of the uncrosslinked rubber powder. In particular, when the uncrosslinked rubber powder is stored or applied to the additive manufacturing apparatus 100 described below, the manufacturing accuracy of the rubber product can be improved, and the uncrosslinked rubber powder can be easily stored and supplied.

The average diameter of the uncrosslinked rubber powder (raw rubber powder) to which the adhesion prevention treatment is applied is preferably from 1 μm to 500 μm. By the average diameter being 1 µm or more, floating during storage and other times can be suppressed, and the mutual adhesion of the raw rubber powder can more effectively be suppressed. By the average diameter being 500 µm or less, the manufacturing accuracy of the rubber product can be further improved.

In the below steps from the thin piece data acquisition step onwards, the raw rubber powder is used to manufacture the rubber product 10. The manufacturing apparatus is not particularly limited as long as the method of manufacturing a rubber product according to the present disclosure can be implemented, but an additive manufacturing apparatus 100 with the following form can, for example, be used.

FIG. 4 is a perspective view schematically illustrating the configuration of the additive manufacturing apparatus 100. The stacking direction is hereinafter designated the Z-axis direction, and two orthogonal directions in any plane orthogonal to the Z-axis direction are designated the X-axis and the Y-axis.

As illustrated in FIG. 4, the additive manufacturing apparatus 100 includes a manufacturing table 110, a powder supply nozzle 120, and electron beam irradiation means 130.

The manufacturing table 110 includes a manufacturing table body 111 for manufacturing a rubber product. A surface 111a is arranged on the top surface of the manufacturing table body 111. The manufacturing table 110 has a rectangular plate-like shape in the illustrated example but may have a circular cylinder shape, polygonal cylinder shape, or the like.

The manufacturing table 110 may be supported by a support 112. The support 112 can variably support the position. The support 112 can adjust the position of the manufacturing table 110 in some or all of the XYZ-axis directions. For example, a piston member using hydraulic or pneumatic pressure, or a ball screw, can be provided as means of adjusting the position of the manufacturing table 110 in the Z-axis direction. For example, a guide member that guides in the XY-axis direction or a rotating member that rotates the manufacturing table 110 about a point in plan view can be provided as means for adjusting the position of the manufacturing table 110 in the XY-axis direction.

The manufacturing table 110 can also be supported immovably.

In the additive manufacturing apparatus 100, the powder supply nozzle 120 is arranged at a distance in the Z-axis direction with respect to the surface 111a. Although any powder supply nozzle 120 can be used, the powder supply nozzle 120 in the illustrated example includes a powder housing 121 and a powder discharger 122.

In the powder supply nozzle 120, the powder housing 121 can house the raw rubber powder inside. In the illustrated example, the powder housing 121 is a space divided into a cylindrical shape, but the shape is not particularly limited. The powder housing 121 may be configured to allow direct filling of the raw rubber powder into the powder housing 121, or to receive, via a tube or the like, raw rubber powder that was filled into another housing (not illustrated).

The powder discharger 122 includes a powder discharge passage 122a that is connected to the powder housing 121 and a powder discharge port 122b that opens to the outside from the powder discharge passage 122a. The powder discharger 122 can supply the raw rubber powder in the powder housing 121 through the powder discharge passage 122a to the outside from the powder discharge port 122b.

The powder supply nozzle 120 may be configured to supply the raw rubber powder to the outside by spraying. For example, inert gas ejection means can be provided at or around the powder discharge port 122b, and an inert gas such as argon gas, nitrogen gas, or helium gas can be discharged from the powder discharge port 122b together with the raw rubber powder, so that the raw rubber powder is supplied by being sprayed onto the surface 111a of the manufacturing table 110.

The powder supply nozzle 120 may include a support mechanism 123 (not illustrated). The support mechanism 123 supports the powder supply nozzle 120 and can adjust the position thereof in the XYZ-axis direction.

Furthermore, the powder supply nozzle 120 can adjust the supply amount, supply rate, supply diameter, and the like of the raw rubber powder.

Two powder supply nozzles 120 are depicted in FIG. 4, but one, or three or more, may be provided.

In the additive manufacturing apparatus 100, the electron beam irradiation means 130 is arranged at a distance in the Z-axis direction with respect to the surface 111a. Although any electron beam irradiation means 130 can be used, at least one electron beam source 131 and an electron beam adjusting means 132 are preferably used.

The electron beam source 131 can be a thermal electron emission type electron gun. More specifically, for example, thermal electrons are generated by heating a cathode formed by tungsten, $LaB_6$, $CeB_6$, or the like, and an electron beam is generated by accelerating the thermal electrons.

The electron beam adjusting means 132 can, for example, include a magnetic field generator 132a and a focus controller 132b. Using the magnetic force of a permanent magnet, an electromagnet, or the like, the magnetic field generator 132a can adjust the convergence, deflection, and the like of the electron beam generated by the electron beam source 131. The focus controller 132b can also adjust the focus of the electron beam at the irradiation target using an optical lens, an electromagnetic lens, or the like. Although one electron beam source 131 is depicted in the illustrated example, a plurality of electron beam sources 131 may be included, each of which may be controlled under different irradiation conditions.

The electron beam irradiation means 130 may include a support mechanism 133 (not illustrated). The support mechanism 133 may immovably support the electron beam irradiation means 130, or may support the electron beam irradiation means 130 while being capable of adjusting the position of the powder supply nozzle 120 in the XYZ-axis directions.

By being housed in a chamber (not illustrated) or the like, the additive manufacturing apparatus 100 can be used in a near-vacuum environment during operation of the electron beam irradiation means 130.

Furthermore, the additive manufacturing apparatus 100 can be connected over a network to a control device 200. The control device 200 includes a hardware processor, such as a central processing unit, and includes a thin piece data acquisition interface 201 and a manufacturing controller 202.

The thin piece data acquisition interface 201 can acquire the data on the thin pieces necessary for manufacturing the rubber product 10.

The manufacturing controller 202 can control the additive manufacturing by providing instructions and information, via a network, to each component of the additive manufacturing apparatus 100 based on the data on the thin pieces. That is, the manufacturing controller 202 can control the operations of the manufacturing table 110, the powder supply nozzle 120, the electron beam irradiation means 130, and the like, which configure the additive manufacturing apparatus 100.

Each of the steps from the thin piece data acquisition process S2 onwards in the method of manufacturing a rubber product according to the present embodiment will be described below in detail with an example using the additive manufacturing apparatus 100.

[Thin Piece Data Acquisition]

In the thin piece data acquisition step S2, the thin piece data on the rubber product 10, which is necessary for manufacturing the rubber product 10, is acquired by the thin piece data acquisition interface 201 of the control device 200.

The thin piece data can, for example, be acquired by converting three-dimensional manufacturing data on the rubber product 10. More specifically, the thin piece data acquisition interface 201 acquires the three-dimensional manufacturing data from an apparatus such as another computer that is connected to the control device 200 or that can transmit information to the control device 200. Here, the three-dimensional manufacturing data for manufacturing the rubber product 10 is, for example, three-dimensional manufacturing data designed by three-dimensional CAD, or three-dimensional manufacturing data captured by a three-dimensional scanner, digitizer, or the like. The three-dimensional manufacturing data may be converted into Standard Triangulated Language (STL) format, in which the surface of the three-dimensional rubber product 10 is represented as a collection of triangles. This three-dimensional manufacturing data on the rubber product 10 is acquired by the thin piece data acquisition interface 201 and converted into data on thin pieces L1 to LN (N is a natural number). The thin piece data refers to the data on the thin pieces L1 to LN and may include data on a manufacturing path based on the data on the thin pieces L1 to LN.

Three-dimensional manufacturing data may also be converted to thin piece data by an apparatus such as another computer that is connected to the control device 200 or is capable of transmitting information to the control device 200, and the thin piece data may then be acquired by the thin piece data acquisition interface 201.

[Raw Rubber Powder Supply and Electron Beam Irradiation]

Figure 5A:
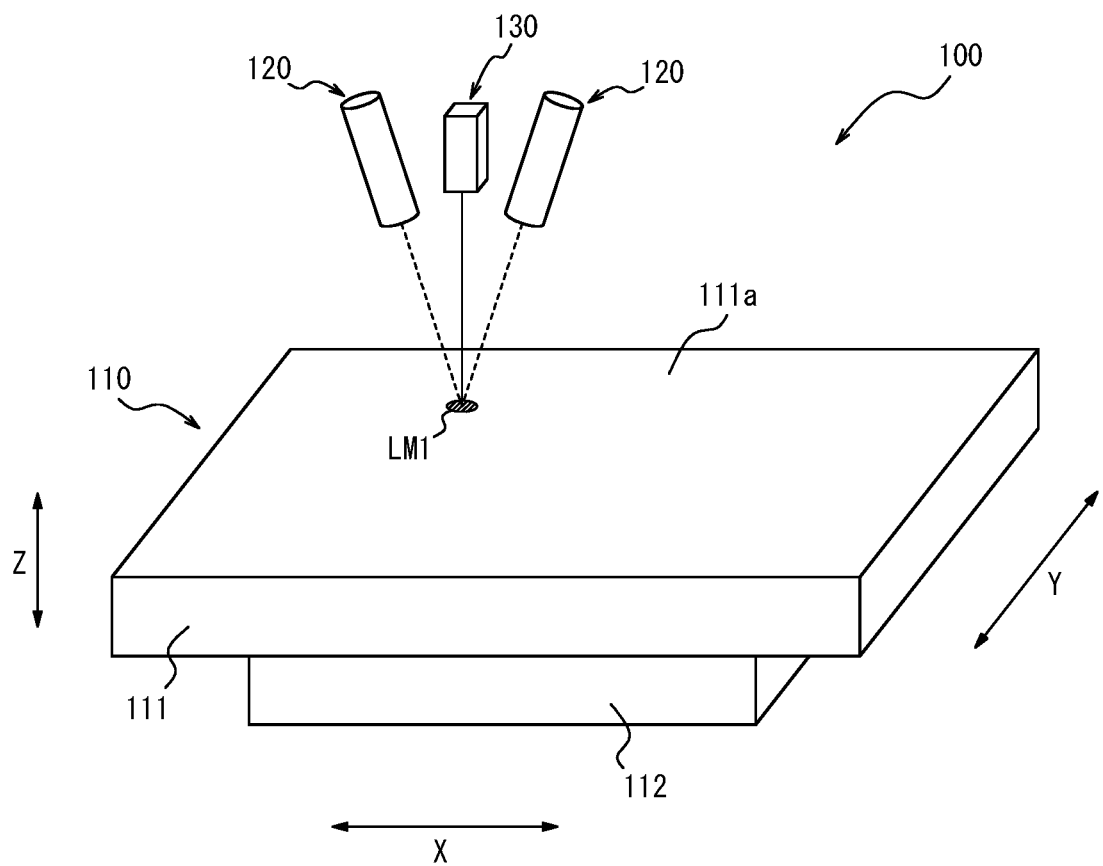
FIG. 5A is a perspective view schematically illustrating formation of a starting portion of raw rubber powder.

Step S3 and onwards, after the thin film data acquisition, will be described with reference to FIGS. 5A to 5F. In FIG. 5A and subsequent figures, the control device 200 is omitted.

After the thin piece data acquisition, forming is carried out by supplying raw rubber powder, on which the adhesion prevention treatment has been performed, and irradiating the supplied portion with an electron beam to crosslink the irradiated portion, and the forming is sequentially repeated so that the crosslinked portions are stacked following the shape of the rubber product.

FIG. 5A is a diagram illustrating the forming of the starting portion LM1, which is the first portion to be formed in the layer M1 corresponding to the thin piece L1. The position of the starting portion LM1 can be determined according to the manufacturing path based on the data on the thin piece L1.

As illustrated in FIG. 5A, raw rubber powder, on which the adhesion prevention treatment has been performed, is supplied to the surface 111a of the manufacturing table 110. The means for supplying the raw rubber powder on which the adhesion prevention treatment has been performed is not particularly limited. For example, the powder supply nozzle 120 can be used. The powder housing 121 is filled with the raw rubber powder, and the powder supply nozzle 120 can supply the raw rubber powder through the powder discharge passage 122a of the powder discharger 122 to the outside from the powder discharge port 122b.

The powder supply nozzle 120 can also use an inert gas to adjust the supply rate and the like of the raw rubber powder from the powder discharge port 122b. For example, an inert gas such as argon gas, nitrogen gas, or helium gas can be discharged from the powder discharge port 122b together with the raw rubber powder, so that the raw rubber powder is supplied by being sprayed onto the surface 111a of the manufacturing table 110.

The position at which the raw rubber powder is supplied by the powder supply nozzle 120 is the position at which the starting portion LM1 should be formed and can be adjusted by the support mechanism 123 of the powder supply nozzle 120.

Furthermore, according to the shape and thickness of the starting portion LM1, the supply amount, supply rate, and supply diameter of the raw rubber powder can be adjusted by the powder supply nozzle 120.

The thickness t1 of the starting portion LM1, which is a thickness corresponding to the thin piece L1, can be adjusted according to the irradiation conditions of the electron beam described below, the average particle size of the raw rubber powder, and the like, but is preferably 500 μm or less for uniform crosslinking over the thickness direction.

In the illustrated example, two powder supply nozzles 120 are used to supply the raw rubber powder, but one, or three or more, powder supply nozzles 120 may be used. In the case in which a plurality of powder supply nozzles 120 is used, each powder supply nozzle 120 may be filled with a different type of raw rubber powder, and some of the powder supply nozzles 120 may be filled with a material other than raw rubber powder. If each powder supply nozzle 120 is filled with a different type of raw rubber powder, the type of the raw rubber powder can be changed during the manufacturing process according to the manufacturing conditions of the rubber product 10, so that rubber products using a plurality of different raw rubber powders can easily be manufactured. Also, by simultaneously supplying a plurality of raw rubber powders or a raw rubber powder and other materials from a plurality of powder supply nozzles 120, the materials can be mixed on the surface 111a of the manufacturing table 110 without needing to be mixed in the powder supply nozzles.

Formation is carried out by the above-described supply of the raw rubber powder, along with irradiation of the supplied portion of the raw rubber powder with an electron beam to crosslink the irradiated portion. The electron beam irradiation means is not particularly limited, but the electron beam irradiation means 130, for example, can be used. The electron beam generated by the electron beam source 131 of the electron beam irradiation means 130 is converged and deflected by the magnetic field generator 132a to irradiate the position where the starting portion LM1 is to be formed. The irradiation position of the electron beam may be adjusted by adjusting the position of the manufacturing table 110 with the support 112 so that the position where the starting portion LM1 is to be formed is irradiated by the electron beam. Alternatively, the irradiation position may be adjusted by the magnetic field generator 132a, or by adjusting the position of the electron beam irradiation means 130 with the support mechanism 133. The focus controller 132b enables adjustment of the position where the electron beam achieves just focus, i.e., the focus.

When the position on the surface 111a of the manufacturing table 110 where the raw rubber powder is supplied, which is also position where the starting portion LM1 is to be formed, is irradiated with the electron beam, the rubber molecules of the raw rubber powder are provided with energy by high-speed electrons. The high-speed electrons cleave the molecular bonds, which generates radicals, and the radicals react between molecular chains to form a three-dimensional structure, yielding a crosslinking reaction.

According to the electron beam crosslinking means, the location to be crosslinked can be changed by controlling the position where the electron beam is irradiated, thus eliminating the need to prepare a mold and other such hassle, and enabling a flexible response to changes in product shape. Furthermore, a high manufacturing accuracy can be achieved. Rubber products with complex shapes that are difficult to remove from a mold, or that cannot be manufactured with a mold, can also be manufactured.

The irradiation conditions of the electron beam can be controlled by the control device 200 based on the thin piece data on the rubber product 10 that is to be manufactured. The specific irradiation conditions of the electron beam can be adjusted appropriately according to factors such as the shape and thickness of the starting portion LM1 and the average diameter of the raw rubber powder. For example, the following irradiation conditions can be used.

For example, the focusing of the electron beam is preferably set to achieve just focus on the surface of the supplied portion (the surface of the starting portion LM1) to generate a sufficient crosslinking reaction in the rubber.

Although the temperature at the time of electron beam irradiation is not particularly limited, the supply of the raw rubber powder and the irradiation with the electron beam are preferably performed in a temperature environment lower than the melting point of the rubber. According to the above configuration, the crosslinking reaction can be produced at a lower temperature than with means for vulcanizing rubber by heating. Bubbles that might be generated in the rubber by heating can therefore be suppressed, and cracks or tears can be prevented from occurring at the areas with bubbles.

Furthermore, the electron beam irradiation is preferably performed in a high vacuum environment to prevent deactivation of the radicals by oxygen. For example, when the additive manufacturing apparatus 100 is housed in a chamber or the like, a high vacuum is created in the chamber.

As described above, the crosslinked portion can be formed as the starting portion LM1 by supplying the raw rubber powder and irradiating the supplied portion with an electron beam.

Figure 5B:
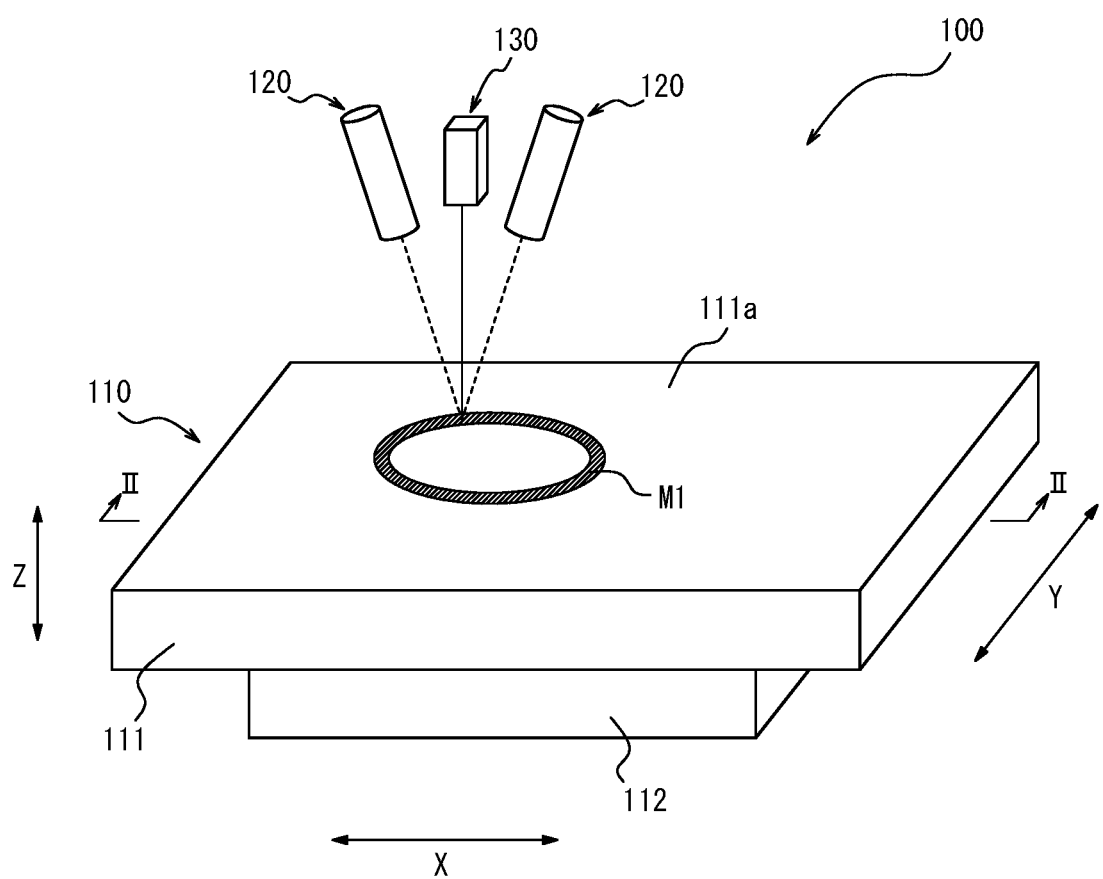
FIG. 5B is a perspective view schematically illustrating a state in which a layer corresponding to a thin piece has been manufactured.

FIG. 5B is a perspective view schematically illustrating a state in which the layer M1 corresponding to the thin piece L1 has been manufactured. FIG. 5C is a cross-sectional view schematically illustrating a state in which the layer M1 corresponding to the thin piece L1 has been manufactured and schematically illustrates a cross-section along line II-II of FIG. 5B. By sequentially repeating the supply of the raw rubber powder and the irradiation of the supplied portion with the electron beam while adjusting the supply position of the raw rubber powder and the irradiation position of the electron beam according to the data on the manufacturing path based on the thin piece data, a ring-shaped layer M1 corresponding to the thin piece L1 can be manufactured as in the illustrated example.

FIG. 5D is a diagram illustrating the treatment after the layer M1 corresponding to the thin piece L1 has been manufactured. After the layer M1 is manufactured, the supply position of the raw rubber powder and the irradiation position of the electron beam in the Z-axis direction are adjusted to manufacture the layer M2 corresponding to the next thin piece L2 to be stacked on the thin piece L1. In the illustrated example, the supply position of the raw rubber powder and the irradiation position of the electron beam are adjusted by lowering the manufacturing table 110 by the thickness of the layer M1. Adjustment is not limited to the adjusting means in the illustrated example, and the supply position of the raw rubber powder and the irradiation position of the electron beam may be adjusted by raising the positions of the powder supply nozzle 120 and the electron beam irradiation means 130 in the Z-axis direction by the thickness of the layer M1.

Figure 5E:
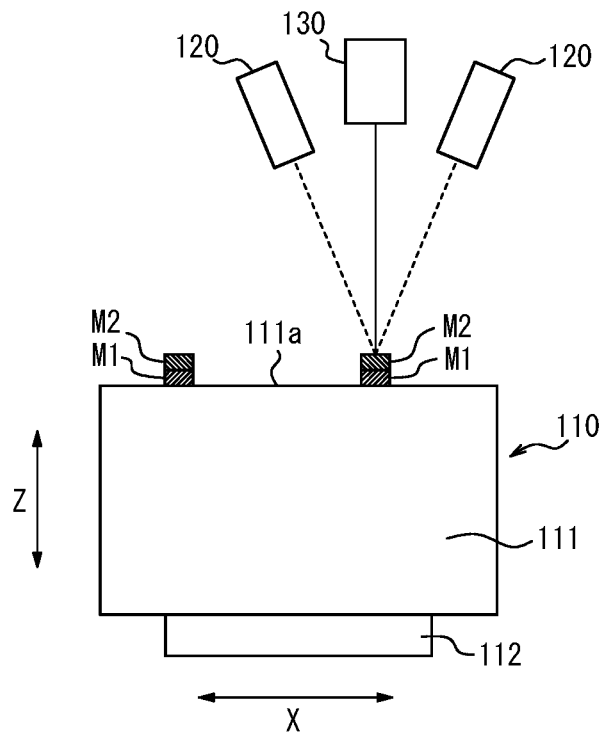
FIG. 5E is a cross-sectional view schematically illustrating the manufacturing of the next layer corresponding to the next thin piece.

FIG. 5E is a diagram illustrating the manufacturing of the next layer M2 corresponding to the next thin piece L2. As illustrated in FIG. 5E, raw rubber powder is supplied by the powder supply nozzle 120 onto the surface of the layer M1.

The supply position, supply amount, supply rate, and supply diameter of the raw rubber powder by the powder supply nozzle 120 can be adjusted appropriately in the same manner as the formation of the starting portion LM1 in the layer M1.

Formation is carried out by the above-described supply of the raw rubber powder, along with irradiation of the supplied portion of the raw rubber powder with an electron beam on the surface of the layer M1 to crosslink the irradiated portion.

The irradiation conditions of the electron beam may be the same as the irradiation conditions at the time of formation of the starting portion LM1 in the layer M1, or may be different.

For example, in the first layer M1, the focusing of the electron beam may be controlled so that the electron beam achieves just focus on the surface of the supplied portion, and in the second layer M2, a plurality of electron beam supply sources may be used and the electron beams controlled to achieve just focus on the surface of the supplied portion and on the boundary with the adjacent layer M1 immediately below the layer M2. According to the above configuration, the supplied portion in the layer M2 can be sufficiently crosslinked, and the crosslinked portions of the adjacent layers M1 and M2 can be bonded together.

The focusing of the electron beam can be controlled so that the focusing is always the same, or the focusing can be changed.

Although the temperature at the time of electron beam irradiation is not particularly limited during manufacturing of the layer M2 either, the crosslinking is preferably performed in a temperature environment lower than the melting point of the rubber, as during the manufacturing of the layer M1. According to the above configuration, the manufacturing accuracy can be further enhanced, and deterioration of the rubber product due to heating can be prevented.

Figure 5F:
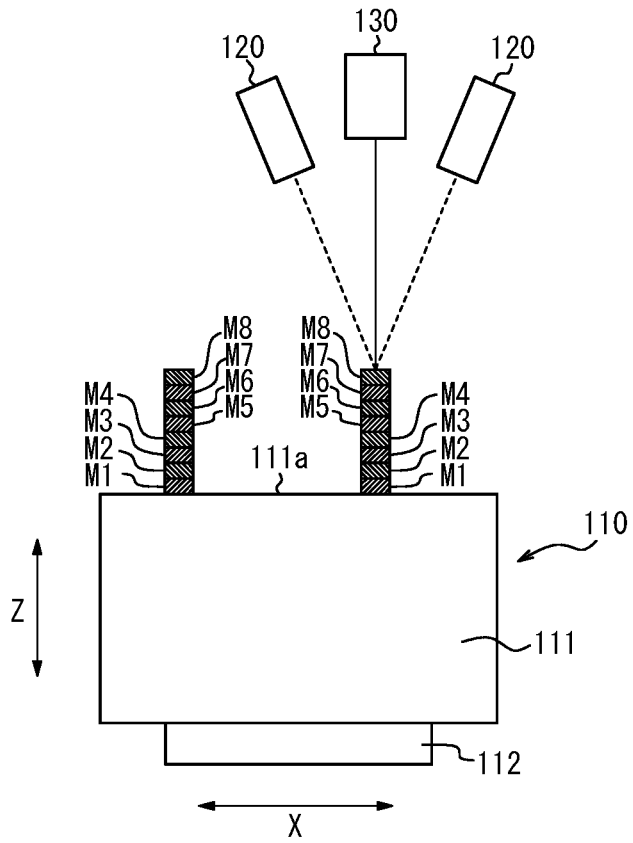
FIG. 5F is a cross-sectional view schematically illustrating a state in which the formation has been repeated to stack the layers.

In FIG. 5F, the formatting of the crosslinked portion is repeated, and the layers M1 to M8 are stacked. After manufacturing of the layer M2 as described above, in order to manufacture the layer M3 corresponding to the next thin piece L3 to be stacked on the thin piece L2, formation is repeated by adjusting the supply position of the raw rubber powder and the irradiation position of the electron beam in the Z-axis direction, supplying the raw rubber powder onto the surface of the layer manufactured immediately before, and irradiating the supplied portion with the electron beam to crosslink the irradiated portion, so that the crosslinked portions are stacked following the shape of the rubber product 10 to manufacture the rubber product 10.

The method of manufacturing a rubber product including each of the above steps can flexibly respond to changes in the shape of the product and achieve high manufacturing accuracy. Furthermore, since the raw material rubber powder is supplied following the shape of the rubber product 10, there is no need to process the uncrosslinked raw material rubber powder, and even if uncrosslinked raw material rubber powder remains, only a small amount remains. The work time can thus be shortened.

Figure 6:
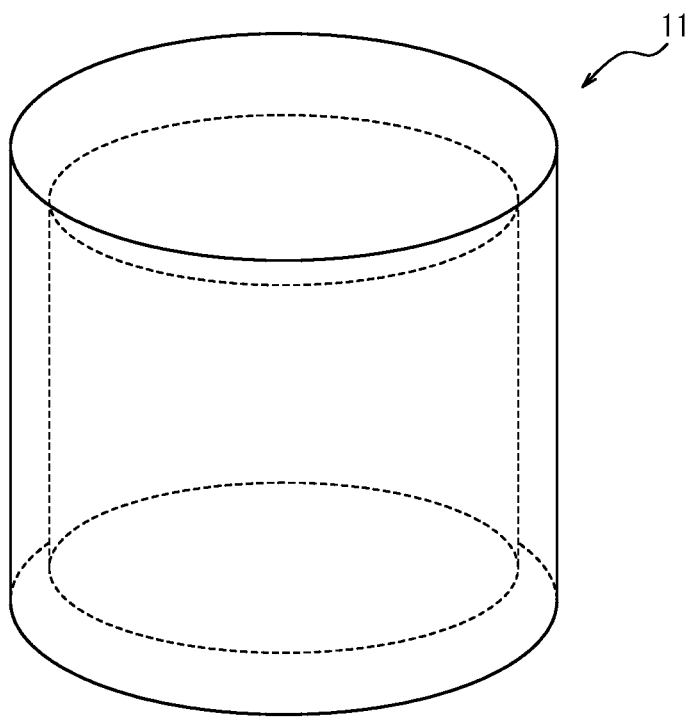
FIG. 6 is a perspective view transparently illustrating another example of a rubber product manufactured by the method of manufacturing a rubber product according to an embodiment of the present disclosure.

Another example of the rubber product is a rubber product 11 having a shape such that a cylindrical hollow 11a is formed inside a cylinder, as illustrated in FIG. 6. According to the method for manufacturing a rubber product including the above steps S1 to S3, the rubber product 11 having a hollow 11a can be manufactured. Furthermore, according to the above method of manufacturing, since the raw rubber powder is supplied following the shape of the rubber product 11, nearly no uncrosslinked raw rubber powder remains in the hollow 11a. A hollow rubber product can therefore easily be manufactured without processing uncrosslinked raw rubber powder.

Figure 7:
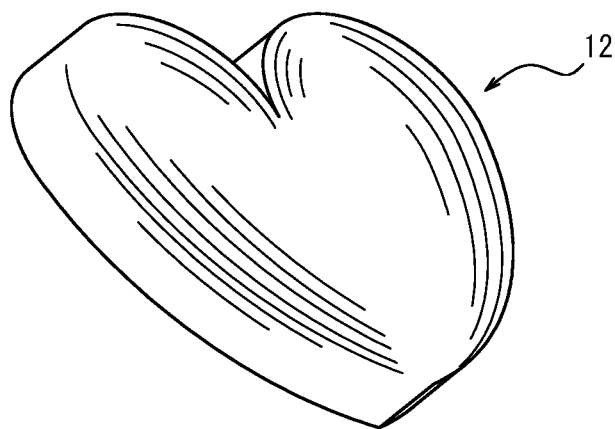
FIG. 7 is a perspective view transparently illustrating yet another example of a rubber product manufactured by the method of manufacturing a rubber product according to an embodiment of the present disclosure.

Another example of the rubber product is a rubber product 12 having a shape such that the entire outer circumference is curved, and a hollow is formed inside, as illustrated in FIG. 7. According to the method for manufacturing a rubber product including the above steps S1 to S3, the rubber product 12 having a hollow can be manufactured. Furthermore, according to the above method of manufacturing, since the raw rubber powder is supplied following the shape of the rubber product 12, nearly no uncrosslinked raw rubber powder remains in the hollow. A hollow rubber product can therefore easily be manufactured.

INDUSTRIAL APPLICABILITY

The method of manufacturing a rubber product of the present disclosure can be suitably applied to the manufacturing of rubber products such as anti-vibration rubber, seismic isolation rubber, tires, and tire treads.

REFERENCE SIGNS LIST 10, 11, 12 Rubber product
100 Additive manufacturing apparatus
110 Manufacturing table
111 Manufacturing table body
111a Surface
112 Support
120 Powder supply nozzle
121 Powder housing
122 Powder discharger
122a Powder discharge passage
122b Powder discharge port
130 Electron beam irradiation means
131 Electron beam source
132a Magnetic field generator
132b Focus controller
200 Control device
201 Thin piece data acquisition interface
202 Manufacturing controller
L1, L2, L3 Thin piece
LM1 Starting portion
M1 to M8 Layer

The invention claimed is:

1. A method of manufacturing a rubber product, the method comprising:
   performing adhesion prevention treatment on uncrosslinked rubber powder, which is a material of the rubber product, to prevent mutual adhesion of the uncrosslinked rubber powder; and
   sequentially and repeatedly forming layers of the rubber product layer-by-layer by supplying the uncrosslinked rubber powder, on which the adhesion prevention treatment has been performed, and irradiating the supplied uncrosslinked rubber powder with an electron beam to crosslink the uncrosslinked rubber powder, wherein the formed layers follow a shape of the rubber product.

2. The method of manufacturing a rubber product of claim 1, wherein the forming is performed in a temperature environment lower than a melting point of rubber in the rubber powder.

3. The method of manufacturing a rubber product of claim 1, wherein the uncrosslinked rubber powder includes calcium oxide.

4. The method of manufacturing a rubber product of claim 2, wherein the uncrosslinked rubber powder includes calcium oxide.

* * * * *